US011917551B2

(12) United States Patent
Seok et al.

(10) Patent No.: US 11,917,551 B2
(45) Date of Patent: Feb. 27, 2024

(54) APPARATUS AND METHODS FOR COORDINATED SPATIAL REUSE IN A WIRELESS NETWORK

(71) Applicant: MediaTek Singapore Pte. Ltd., Singapore (SG)

(72) Inventors: Yongho Seok, San Jose, CA (US); Gary A. Anwyl, San Jose, CA (US); Jianhan Liu, San Jose, CA (US); Kai Ying Lu, San Jose, CA (US); James Chih-Shi Yee, San Jose, CA (US); Thomas Edward Pare, Jr., San Jose, CA (US); James June-Ming Wang, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/217,486

(22) Filed: Mar. 30, 2021

(65) Prior Publication Data
US 2021/0314879 A1    Oct. 7, 2021

Related U.S. Application Data

(60) Provisional application No. 63/049,720, filed on Jul. 9, 2020, provisional application No. 63/015,828, filed
(Continued)

(51) Int. Cl.
*H04W 84/12* (2009.01)
*H04W 52/24* (2009.01)
(Continued)

(52) U.S. Cl.
CPC ........ *H04W 52/245* (2013.01); *H04B 17/318* (2015.01); *H04W 52/241* (2013.01); *H04W 52/367* (2013.01); *H04W 84/12* (2013.01)

(58) Field of Classification Search
CPC .. H04L 12/28; H04W 52/245; H04W 52/241; H04W 52/367
(Continued)

(56) References Cited

U.S. PATENT DOCUMENTS

2016/0286499 A1    9/2016    Lim et al.
2018/0084554 A1    3/2018    Chu et al.
(Continued)

FOREIGN PATENT DOCUMENTS

WO    WO-2020097487 A1 *    5/2020    ............. H04B 7/024

OTHER PUBLICATIONS

Jason Yuchen Guo(Huawei Technologies Co Ltd): "Coordinated Spatial Reuse Operation" Dec. 31, 2019. 13 pp.
(Continued)

*Primary Examiner* — Dang T Ton

(57) ABSTRACT

Embodiments of the present invention are drawn to methods and electronic devices capable of performing coordinate spatial reuse for wirelessly transmitting data on a channel in coordination with another wireless AP operating an overlapping BSS using the same wireless channel. The device can perform RSSI measurements and generate Per-RU RSSI reports including the RSSI measurements information for transmission to another wireless AP. The RSSI measurement can be performed by the device based on power levels detected when receiving TB PPDUs transmitted by wireless STAs responsive to trigger frames, for example. Based on the Per-RU RSSI report, a wireless AP can be configured to transmit data to an associated wireless STA without causing significant interference when another AP of the overlapping BSS is also transmitting, and can schedule frames for transmission from associated wireless STAs accordingly.

19 Claims, 12 Drawing Sheets

Related U.S. Application Data on Apr. 27, 2020, provisional application No. 63/003,353, filed on Apr. 1, 2020.

(51) Int. Cl.
  *H04B 17/318* (2015.01)
  *H04W 52/36* (2009.01)

(58) Field of Classification Search
  USPC .......................................................... 370/329
  See application file for complete search history.

(56) References Cited

U.S. PATENT DOCUMENTS

| | | |
|---|---|---|
| 2019/0141749 A1 | 5/2019 | Seok et al. |
| 2020/0077273 A1 | 3/2020 | Cherian et al. |
| 2021/0058936 A1* | 2/2021 | Gordaychik ........ H04W 72/085 |

OTHER PUBLICATIONS

Jason Yuchen Guo (Huawei Technologies Co Ltd): "coordinated spatial reuse operation" ,IEEE Draft;11-20-0033-00-00BE-COORDINATED-SPATIAL-REUSE-OPERATION, IEEE-SA Mentor, Piscataway,NJ USA vol. 802.11 EHT; 8O2.llbe Jan. 13, 2020 (Jan. 13, 2020), pp. 1-13,XPO68165167, Retrieved from the Internet:URL:https://mentor.ieee.org/8O2.11/dcn/2O/11-2O-OO33-OO-OObe-coordinated-spatial-reuse-operation.pptx [retrieved on Jan. 13, 2020]* pp. 2,4-12 *.

Jason Yuchen Guo (Huawei Technologies):"ap-coordination-in-eht",IEEE Draft;11-19-0801-00-00BE-AP-COORDINATION-IN-EHT,IEEE-SA Mentor, Piscataway, NJ USAvol. 802.11 EHT; 802. 11be May 10, 2019 (May 10, 2019), pp. 1-12, XP068151068, Retrieved from the Internet: URL:https://mentor.ieee.org/802.11/dcn/19/11-19-0801-00-00be-ap-coordination-in-eht.pptx [retrieved on May 10, 2019]* pp. 2,3,10 *.

* cited by examiner

| Category (Public Action) | Action (Per-RU RSSI Report) | Interference Measurement Dialog Token | Number Of Reported RUs | AID Associated With Reported RU | Measured RSSI On Reported RU |
|---|---|---|---|---|---|
| 1 octet | 1 octet | 1 octet | 1 octet | 2 octet | 1 octet |

Repeated as indicated in the Number Of Reported RUs field (for AID Associated With Reported RU and Measured RSSI On Reported RU columns)

FIG. 6

APPARATUS AND METHODS FOR COORDINATED SPATIAL REUSE IN A WIRELESS NETWORK

CROSS-REFERENCE TO RELATED APPLICATIONS

This application claims the benefit of and priority to provisional patent application Ser. No. 63/003,353, with filing date Apr. 1, 2020, provisional patent application Ser. No. 63/015,828, with filing date Apr. 27, 2020, and provisional patent application Ser. No. 63/049,720, with filing date Jul. 9, 2020, which is hereby incorporated by reference in its entirety.

FIELD

Embodiments of the present invention generally relate to the field of wireless communications. More specifically, embodiments of the present invention relate to systems and methods for spatial reuse in a wireless network.

BACKGROUND

Many modern electronic devices send and receive data with other electronic devices wirelessly using Wi-Fi. When an area is densely populated with Wi-Fi enabled devices, it is expected that several wireless stations may attempt to transmit data at the same time. If a wireless device receives signals simultaneously from two sources of similar strength on the same frequency channel, the wireless device may be unable to successfully decipher either signal. Accordingly, the IEEE 802.11 standard provides a distributed coordination function (DCF) for collision avoidance.

When multiple Access Points are present in the same physical area (e.g., an office building), spatial reuse is a transmission technique that can be employed so that wireless devices of different basic service sets (BSS) can communicate at the same time and on the same wireless channel according to the detected signal strength of any received overlapping BSS (OBSS) frames. Without the spatial reuse technique, a wireless device will not transmit when another transmission is detected on the channel to avoid collisions, even if the transmission is sent by a wireless device of another BSS. Therefore, this approach is inefficient as each device must wait until the channel is idle to transmit data. Spatial reuse operations can use adaptive clear channel assessment (CCA) thresholds for any overlapping BSS (OBSS) frame transmissions. BSS color, also known as BSS coloring, is a well-known method for identifying overlapping basic service sets (OBSSs).

However, existing techniques are unable to coordinate the power levels used for transmission of the OBSSs so that potential interference can be avoided when data is transmitted simultaneously on the same wireless channel.

SUMMARY

What is needed is an approach to spatial reuse that can be employed in a multi-AP EHT operation framework and coordinated by APs in proximity to each other to configure the transmission power used by the APs to transmit and receive data on the same wireless channel simultaneously. Accordingly, embodiments of the present invention provide techniques to coordinate spatial reuse (C-SR) so that the multiple APs can operate overlapping BSSs in a more efficient manner to advantageously improve throughput and reliability of the wireless network. The APs of the OBSS can coordinate transmission power and/or allowable interference levels for downlink and uplink transmissions, respectively, so that frames can be transmitted on the same channel simultaneously without causing significant interference to the devices of an overlapping BSS.

According to one embodiment, a method of configuring a wireless access point for cooperative transmission in a wireless network is disclosed. The method includes a first wireless AP determining transmit power information for transmitting data in cooperation with a second wireless AP based on RSSI measured by the first wireless AP and the second wireless AP, and the first wireless AP transmitting an announcement frame including the transmit power information to the second wireless AP, where the second wireless AP is operable to transmit data on a wireless channel according to the transmit power information.

According to some embodiments, the method includes the first wireless AP transmitting a trigger frame during a transmission opportunity (TXOP) allocating resource units (RUs) to the first wireless AP for wireless transmissions, where the trigger frame causes a first wireless STA to transmit a first TB PPDU responsive to the trigger frame, causes a second wireless STA to transmit a second TB PPDU responsive to the trigger frame, where the first and second TB PPDUs are received by both the first wireless AP and a second wireless AP, and, responsive to the trigger frame, the second wireless AP is operable to: measure RSSI of the first TB PPDU and the second TB PPDU, generate a per-RU RSSI report including measured RSSI for the first TB PPDU and the second TB PPDU for the allocated RUs, and transmit the per-RU RSSI report to the first wireless AP.

According to some embodiments, the method includes the first wireless AP transmitting a second per-RU RSSI report including RSSI measured by the first wireless AP.

According to some embodiments, the first wireless AP and the second wireless AP are operable to measure and report interference simultaneously according to OFDMA.

According to some embodiments, the announcement frame is a control frame.

According to some embodiments, the announcement frame includes a maximum transmit power, and where the second wireless AP transmits data using a transmit power that is equal to or less than the maximum transmit power indicated in the announcement frame According to some embodiments, the announcement frame includes a maximum interference signal strength, where the second wireless AP is operable to schedule transmissions from an associated wireless STA according to the maximum interference signal strength.

According to some embodiments, the per-RU RSSI report is generated according to measured signal-to-interference ratios (SIRs) determined for a plurality of wireless STAs.

According to some embodiments, the first wireless AP and the second wireless AP are configured to transmit data on the same wireless channel using a spatial reuse protocol according to the transmit power information.

According to a different embodiment, a wireless access point (AP) apparatus for transmitting data over a wireless network is disclosed. The wireless AP apparatus includes a transceiver configured to send and receive data over the wireless network, a memory for storing data, and a processor operable to: measure RSSI of a first TB PPDU transmitted by a first wireless STA and a second TB PPDU transmitted by a second wireless STA, determine transmit power information for transmitting in cooperation with the second wireless AP based on the RSSI measured by the first wireless AP and RSSI measured by the second wireless AP, and cause the transceiver to transmit an announcement frame including the transmit power information for receipt by the second wireless AP, where the second wireless AP is operable to transmit data over a wireless channel according to the transmit power information.

According to some embodiments, the processor is further operable to cause the transceiver to transmit a trigger frame during a transmission opportunity (TXOP) allocating resource units (RUs) to the wireless AP for wireless transmissions, where the trigger frame causes a first wireless STA to transmit the first TB PPDU responsive to the trigger frame, causes a second wireless STA to transmit the second TB PPDU responsive to the trigger frame, where the first and second TB PPDUs are received by the wireless AP and a second wireless AP, and where the second wireless AP is operable to measure RSSI of the first TB PPDU and the second TB PPDU, generate a per-RU RSSI report including measured RSSI for the first TB PPDU and the second TB PPDU as measured for the allocated RUs, and transmit the per-RU RSSI report to the first wireless AP.

According to some embodiments, the announcement frame is a control frame.

According to some embodiments, the first wireless AP is operable to transmit a second per-RU RSSI report including RSSI measured by the first wireless AP.

According to some embodiments, the announcement frame includes a C-SR upper threshold transmit power, and where the first wireless AP and the second wireless AP are operable to transmit data simultaneously using the wireless channel, where the second wireless AP uses a transmit power that is equal to or less than a C-SR upper threshold transmit power indicated in the announcement frame.

According to some embodiments, the announcement frame includes a C-SR tolerable upper threshold interference signal strength, where the second wireless AP is operable to schedule transmissions from an associated wireless STA on the wireless channel according to the C-SR tolerable threshold interference signal strength.

According to some embodiments, the per-RU RSSI report is generated according to measured signal-to-interference ratios (SIRs) determined for a plurality of wireless STAs.

According to another embodiment, a method of coordinated spatial reuse is disclosed. The method includes measuring RSSI of a first TB PPDU transmitted by a first wireless STA and a second TB PPDU transmitted by a second wireless STA for an allocated RU, generating a per-RU RSSI report including measured RSSI for the first TB PPDU and the second TB PPDU for the allocated RU, transmitting the per-RU RSSI report to a second wireless AP, receiving an announcement frame including transmit power information for transmitting data in cooperation with the second wireless AP based on the per-RU RSSI report, and transmitting data over a wireless channel in cooperation with the second wireless AP using a spatial reuse protocol according to the transmit power information.

According to some embodiments, the transmit power information includes a threshold transmit power for downlink communication, where the transmitting data includes transmitting an A-MPDU in cooperation with the second wireless AP by transmitting the A-MPDU using a transmit power that is equal to or less than the threshold transmit power.

According to some embodiments, the transmit power information includes an upper threshold interference level for uplink communication, where the transmitting data includes scheduling an A-MPDU for transmission based on the upper threshold interference level for transmission by the first wireless STA or the second wireless STA.

According to some embodiments, the method includes receiving a trigger frame during a transmission opportunity (TXOP) of the second wireless AP allocating resource units (RUs) for wireless transmissions, where the first TB PPDU and second TB PPDU are transmitted responsive to the trigger frame, where the first TB PPDU and second the TB PPDUs are received by the second wireless AP, and where the second wireless AP is operable to measure RSSI of the first TB PPDU and the second TB PPDU, and calculate the transmit power information based on the RSSI of the first TB PPDU and the second TB PPDU and based on the per-RU RSSI report.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6 is an exemplary wireless transmission timing diagram for transmitting data using C-SR where the shared AP performs CCA during the SIFS after the C-SR Announcement frame to transmit an A-MPDU according to embodiments of the present invention.

DETAILED DESCRIPTION

Figure 1:
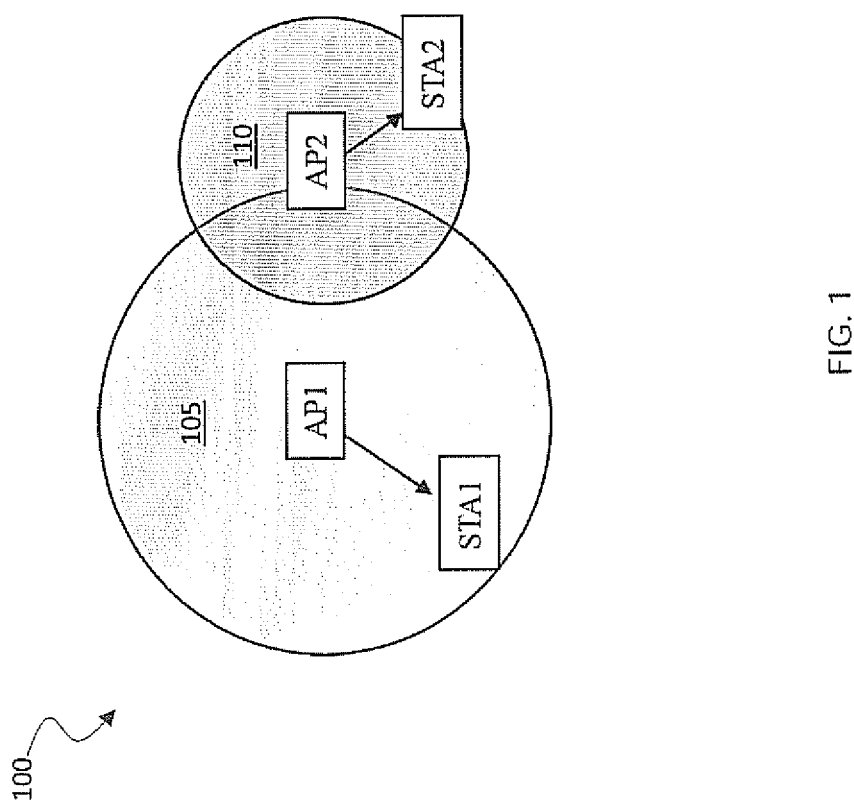
FIG. 1 depicts a diagram of exemplary overlapping basic service sets according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 9-11) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic announces capable of being stored, transferred, combined, compared, and otherwise manipulated in a computer system. It has proven convenient at times, principally for reasons of common usage, to refer to these announces as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "measuring," "accessing," "configuring," "setting," "storing," "transmitting," "retransmitting," "receiving," "generating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Novel Techniques for Coordinated Spatial Reuse

As used herein, the term "EHT" refers generally to a recent generation of wireless communication (e.g., Wi-Fi) known as Extremely High Throughput (EHT) and is defined according to the IEEE 802.11be standards. The term station (STA) refers generally to an electronic device capable of sending and receiving data with a wireless access point (AP) over a Wi-Fi network.

Embodiments of the present invention are drawn to methods and electronic devices for performing coordinate spatial reuse to wirelessly transmit data on a wireless channel in coordination with another wireless AP operating an overlapping BSS using the same wireless channel. The novel device can perform RSSI measurements and generate a Per-Resource Unit (RU) RSSI report including the RSSI measurements information for transmission to another wireless AP. The RSSI measurement can be performed by the device based on power levels detected when receiving TB PPDUs transmitted by wireless STAs responsive to trigger frames, for example. Based on the Per-RU RSSI report, a wireless AP can be configured to transmit data to an associated wireless STA without causing significant interference when another AP of the overlapping BSS is also transmitting, and can schedule frames for transmission from associated wireless STAs accordingly. By limiting the transmit power of another AP to an upper threshold, the AP is prevented from transmitting at a transmit power that will cause interference to inter-BSS transmissions.

With regard to FIG. 1, exemplary overlapping BSSs are depicted according to embodiments of the present invention. In this simple example, the STAs communicate with the nearest AP. Specifically, AP1 communicates with STA1 in BSS 105, and AP2 communicates with STA2 in BSS 110. It is appreciated that when AP1 detects a packet transmitted for BSS 110, AP1 can continue to transmit a packet for BSS 105 if the signal strength of the packet transmitted for BSS 110 is below a threshold according to a spatial reuse protocol. When AP1 and AP2 are configured to perform coordinated spatial reuse (C-SR), AP1 can coordinate the transmit power of AP2 so that AP1 and AP2 can operate simultaneously without causing substantial interference between APs. According to embodiments, C-SR enables an AP to temporarily reduce transmit power for another AP or STA to increase the network throughput and reliability of the overall network.

Figure 2:
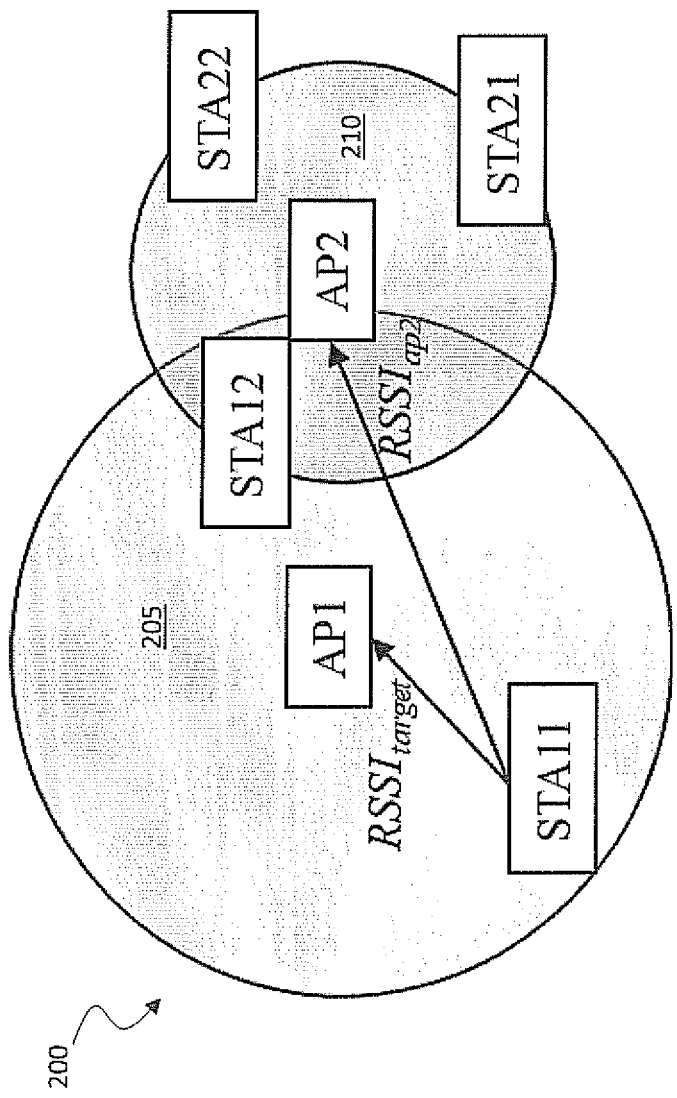
FIG. 2 depicts a diagram of exemplary overlapping BSSs operating using coordinated spatial reuse based on calculated interference levels when AP1 and AP2 simultaneously transmit downlink frames at the same transmit power according to embodiments of the present invention.

FIG. 2 depicts exemplary overlapping BSSs, BSS 205 and BSS 210, operating on the same wireless channel using C-SR based on measured interference levels according to embodiments of the present invention. The interference levels can be calculated when AP1 and AP2 simultaneously transmit downlink frames at the same transmit power. The "sharing" AP (e.g., AP1) and the requested "shared" AP(s)

(e.g., AP2) measure the Received Signal Strength Indicator indicating the received power level for each RU allocated to the APs, and the shared AP(s) transmits a Per-RU RSSI Report frame to the sharing AP having the RSSI measurement results. Specifically, in the example of FIG. 2, the shared AP (AP2) reports $RSSI_{ap2}$ in the Per-RU RSSI Report frame to the sharing AP (AP1), and the sharing AP can calculate the interference level ($RSSI_{target}$–$RSSI_{ap2}$) caused by the shared AP (e.g., AP2) at the associated STA (STA11) when AP1 and the AP2 simultaneously transmit the downlink frames using the same transmit power. The coordinated operation of AP1 and AP2 can be initiated by AP1 sending a CS-R Announcement frame including transmit power information generated according to the measurement report. AP1 and AP2 can coordinate the transmit power of AP2 or of STAs associated with AP2 so that AP1 and AP2 can operate simultaneously without causing substantial interference between APs.

Interference Measurement Report for Coordinated Spatial Reuse

Figure 3:
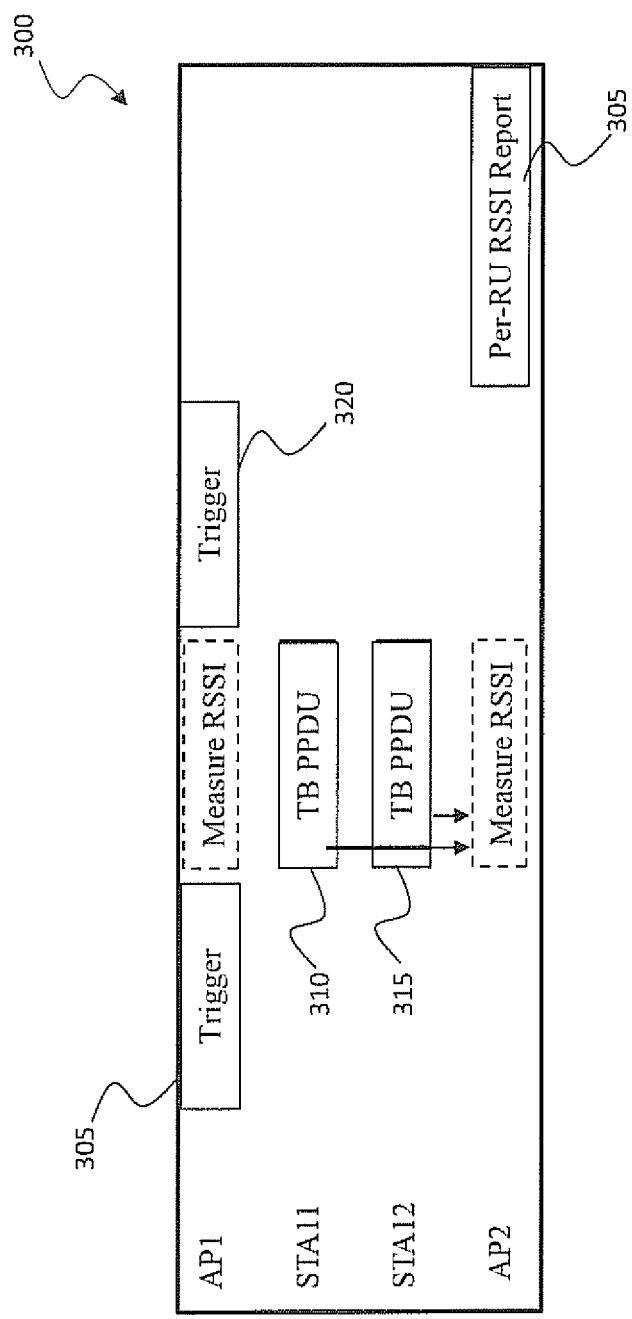
FIG. 3 is an exemplary transmission timing diagram for generating a Per-RU RSSI Report for C-SR operation in a multi-AP environment according to embodiments of the present invention according to embodiments of the present invention.

FIG. 3 depicts an exemplary transmission timing diagram 300 for generating a Per-RU RSSI Report for C-SR operation in a multi-AP environment according to embodiments of the present invention. As depicted in FIG. 3, a sharing AP (AP1) solicits trigger based (TB) physical layer protocol data units (PPDUs) 310 and 315 (e.g., a buffer status report (BSR), a beamforming report (BFR), etc.) from its associated STAs using Trigger frame 305. The sharing AP specifies one or more shared AP(s) among the AP candidate set to request the RSSI measurement on each RU allocated in the User Info field of soliciting Trigger frame 305. The sharing AP and the requested shared AP(s) (AP2) measure the RSSI on the allocated RUs, and the shared AP(s) transmits the Per-RU RSSI Report frame having the measurement results for the allocated RUs to the sharing AP. The measurement and report procedure can occur during the same or different transmission opportunities (TXOPs) for the allocated RUs. According to some embodiments, the sharing AP sends a Trigger frame that solicits Per-RU RSSI Reports from multiple APs simultaneously.

In the example of FIG. 3, AP1 is a TXOP holder and transmits a trigger frame 305 received by STA11 and STA12 associated with AP1. STA11 and STA12 transmit TB PPDU 310 and TB PPDU 315, respectively, for receipt by both AP1 and AP2 responsive to trigger frame 305 for performing RSSI measurements. AP2 transmits a Per-RU RSSI report 320 including the RSSI measurements performed by AP2 based on the transmission of TB PPDUs 310 and 315 responsive to trigger frame 320 transmitted by AP1. Based on Per-RU RSSI report 325, AP1 can determine if AP2 can also transmit without causing significant interference when AP1 is transmitting to STA11 or STA 12 according to a spatial reuse protocol.

At completion of interference and measurement reporting the sharing AP can compile an SIR table in memory using the appropriate information. This table can be used to enable cooperative power management for downlink (DL) or uplink (UL) C-SR operation. The SIR values can be controlled by adjusting $TXPWR_{AP1}$ and $TXPWR_{AP2}$. For example, reducing power levels of $TXPWR_{AP2}$ can reduce interference experienced by AP1 and STAs associated with AP1, when AP2 transmits frames. In general, reducing the transmit power of an AP when transmitting data causes less interference to nearby APs and other wireless devices.

In the example SIR table below (Table I), $TXPWR_{AP1}$ is the TX Power of AP1, $TXPWR_{AP2}$ is the TX Power of AP2, and $RSSI_{STAi \to APj}$ is the received signal strength indicator at $AP_j$ of the signal sent by the $STA_i$. Each associated wireless STA can be included in the SIR table. For example, STA 11, STA 12, STA 21, and STA 22 are depicted in Table I.

Table I

| To/From | AP1 | AP2 |
|---|---|---|
| STA 11 | ($TXPWR_{AP1}$ − $TXPWR_{AP2}$) + ($RSSI_{STA11 \to AP1}$ − $RSSI_{STA11 \to AP2}$) | ($TXPWR_{AP2}$ − $TXPWR_{AP1}$) + ($RSSI_{STA11 \to AP2}$ − $RSSI_{STA11 \to AP1}$) |
| STA 12 | ($TXPWR_{AP1}$ − $TXPWR_{AP2}$) + ($RSSI_{STA12 \to AP1}$ − $RSSI_{STA12 \to AP2}$) | ($TXPWR_{AP2}$ − $TXPWR_{AP1}$) + ($RSSI_{STA12 \to AP2}$ − $RSSI_{STA12 \to AP1}$) |
| STA 21 | ($TXPWR_{AP1}$ − $TXPWR_{AP2}$) + ($RSSI_{STA21 \to AP1}$ − $RSSI_{STA21 \to AP2}$) | ($TXPWR_{AP2}$ − $TXPWR_{AP1}$) + ($RSSI_{STA21 \to AP2}$ − $RSSI_{STA21 \to AP1}$) |
| STA 22 | ($TXPWR_{AP1}$ − $TXPWR_{AP2}$) + ($RSSI_{STA22 \to AP1}$ − $RSSI_{STA22 \to AP2}$) | ($TXPWR_{AP2}$ − $TXPWR_{AP1}$) + ($RSSI_{STA22 \to AP2}$ − $RSSI_{STA22 \to AP1}$) |

The interference to STA 11 from AP1 is calculated as ($TXPWR_{AP1}$−$TXPWR_{AP2}$+($RSSI_{STA11 \to AP1}$−$RSSI_{STA11 \to AP2}$). The interference from STA 11 to AP1 is calculated in the same way. The interference to STA 11 from AP2 is calculated as ($TXPWR_{AP2}$−$TXPWR_{AP1}$)+($RSSI_{STA11 \to AP2}$−$RSSI_{STA11 \to AP1}$). Similar calculations are performed for STA 12, STA 21, and STA 22.

Figure 4:
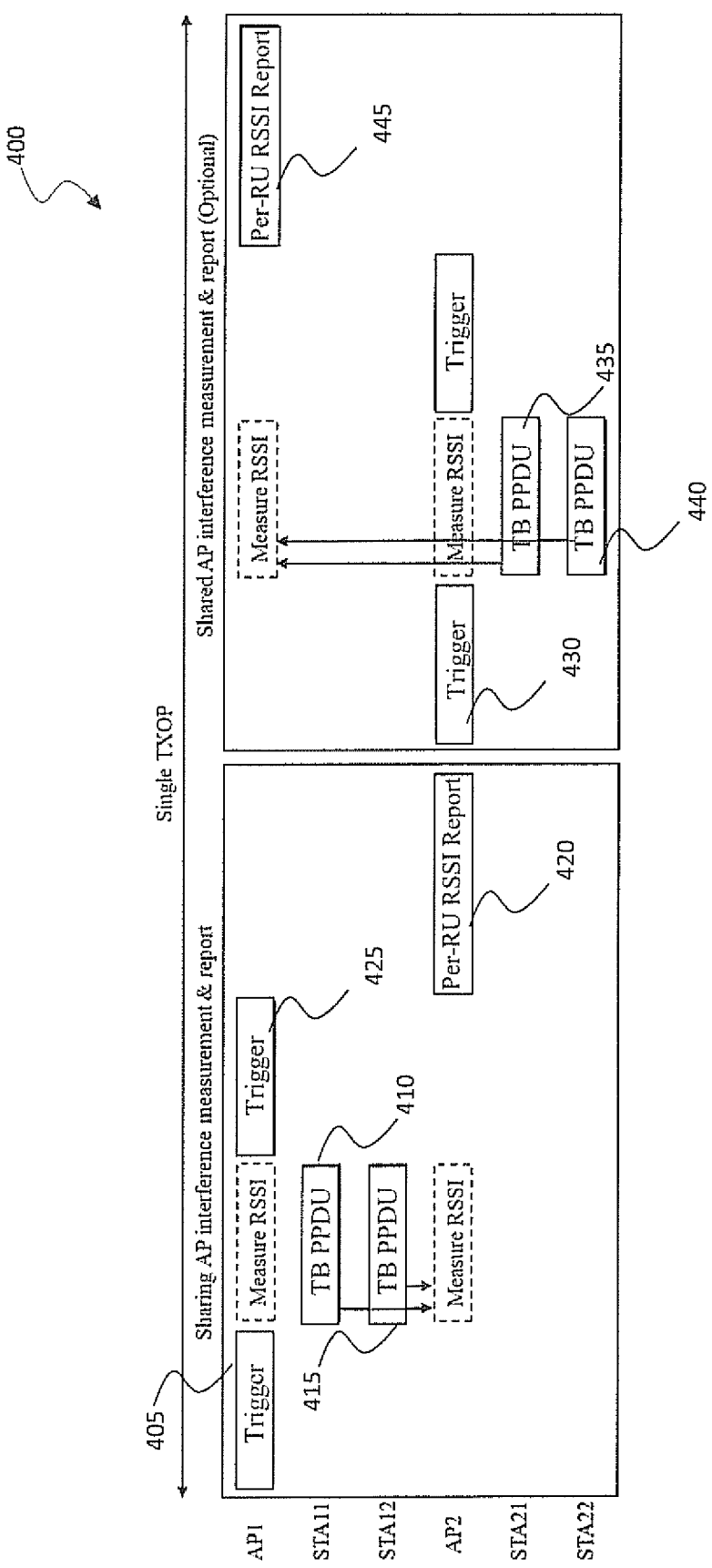
FIG. 4 is a transmission timing diagram where each sharing AP of the AP candidate set for C-SR performs an interference measurement and report procedure during its TXOP according to embodiments of the present invention.

As depicted in transmission timing diagram 400 in FIG. 4, according to some embodiments, each sharing AP of the AP candidate set for C-SR performs an interference measurement-and-report procedure during its TXOP. In the example of FIG. 4, AP1 and AP2 operate overlapping BSSs (see, FIG. 2). The shared AP can sequentially perform the interference measurement-and-report procedure during the sharing AP's TXOP when the sharing AP allows. The first Per-RU RSSI Report contains the measured RSSI on the shared AP side, and optionally the second Per-RU RSSI Report contains the measured RSSI on the sharing AP side. In the example of FIG. 4, both measurements are performed during a single TXOP. In a first phase, the RSSI measurement is performed on the shared AP side. In a second phase (optional), the RSSI measurement is performed on the sharing AP side.

In the first phase, AP1 transmits trigger frame 405 that is received by STA11 and STA12. STA11 and STA12 transmit TB PPDUs 410 and 415, respectively, responsive to trigger frame 405. AP2 receives TB PDDUs 410 and 415 and performs RSSI measurements of the power of the signal during reception of TB PPDUs 410 and 415. Per-RU RSSI Report 420 transmitted by AP2 contains the measured RSSI on the shared AP side and is solicited by trigger frame 425. Per-RU RSSI Report 445 transmitted by AP1 contains the measured RSSI on the sharing AP side in the second phase (optional) and is solicited by trigger frame 430. As described above with regard to FIG. 3, at completion of the interference and measurement reporting period the sharing AP can compile an SIR table using the interference information. This table can be used to enable cooperative power management for downlink (DL) or uplink (UL) C-SR operation by the wireless APs. For example, the SIR table can be used to determine a C-SR tolerable maximum interference signal strength (in units of decibel-miliwatts (dBm)) and a C-SR shared AP interference signal strength for C-SR transmission. The C-SR tolerable maximum interference signal strength configures the maximum total interference signal strength for signals causing interference that effects a sharing AP. The C-SR shared AP interference signal strength indicates the total interference signal strength (interference effecting the shared AP) as a result of transmissions from the sharing AP. This information is used by the scheduling algorithm of the shared AP (e.g., the target STA, the RU, and the modulation and coding scheme (MCS)) for scheduling the transmission of future frames.

According to some embodiments, a second phase of the interference measurement and report procedure is optionally performed. In the second phase, AP2 transmits trigger frame 430 that is received by STA21 and STA22 (associated with AP2). STA21 and STA22 transmit TB PPDUs 435 and 440, respectively, responsive to trigger frame 430. AP1 receives TB PDDUs 435 and 440 and performs RSSI measurements of the signal during reception of TB PPDUs 435 and 440, and the measurement results are included in the Per-RU RSSI Report 445 transmitted by AP1.

Figure 5:
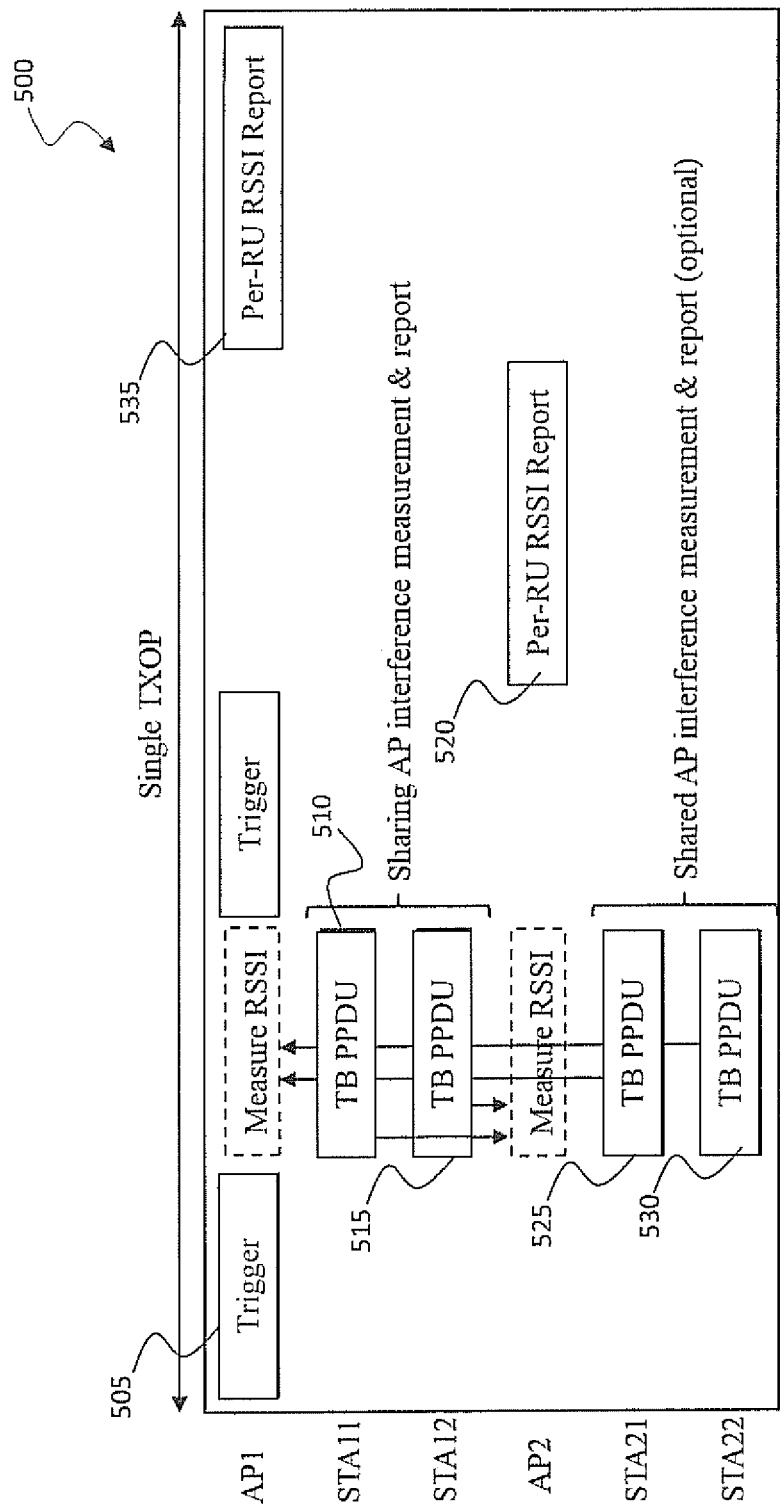
FIG. 5 is an exemplary transmission timing diagram for generating simultaneous Per-RU RSSI Reports by APs for C-SR operation in a multi-AP environment according to embodiments of the present invention.

FIG. 5 depicts an exemplary transmission timing diagram 500 for generating simultaneous Per-RU RSSI Reports for C-SR operation in a multi-AP environment according to embodiments of the present invention. The shared AP(s) perform an interference measurement-and-report procedure with the sharing AP simultaneously in an orthogonal frequency division multiple access (OFDMA) manner. The STAs associated with the shared AP(s) respond by transmitting a TB PPDU when the Trigger frame sent by the sharing AP includes a request to perform the interference measurement and report procedure. As depicted in FIG. 5, the first Per-RU RSSI Report contains the measured RSSI on the shared AP side, and a second Per-RU RSSI Report optionally contains the measured RSSI on the sharing AP side.

In the first phase, responsive to trigger frame 505 transmitted by AP1, STA11 and STA12 associated with sharing AP1 transmit TB PPDUs 510 and 515, respectively, for receipt by AP1 and AP2. AP1 and AP2 receive TB PDDUs 510 and 515 and perform RSSI measurements of the power of the signal during reception of TB PPDUs 510 and 515. Per-RU RSSI Report 520 is transmitted by AP2 and includes the RSSI measured by AP2. In the optional second phase performed simultaneously in an OFDMA manner with the first phase, STA21 and STA22 transmit TB PPDUs 525 and 530, respectively, responsive to trigger frame 505 transmitted by APL. AP1 and AP2 receive TB PDDUs 525 and 530 and performs RSSI measurements of the power of the signal during reception of TB PPDUs 525 and 530. Per-RU RSSI Report 535 is transmitted by AP1 and includes the RSSI measured by AP1. As described above with regard to FIG. 3, at completion of interference and measurement reporting the sharing AP can compile an SIR table using the interference information. This table can be used to enable cooperative power management for downlink (DL) or uplink (UL) C-SR operation.

FIG. 6 depicts an exemplary Per-RU RSSI Report frame format 600 for transmitting an interference measurement report used by a coordinated spatial reuse protocol according to embodiments of the present invention. The RA field of the frame carrying the Per-RU RSSI Report frame (e.g., TB PPDU) is set to the MAC address of the sharing AP that requests the RSSI measurement on each RU allocated in the soliciting Trigger frame. The TA field of the frame carrying the Per-RU RSSI Report frame is set to the MAC address of the shared AP that is sending the Per-RU RSSI Report frame. The Interference Measurement Dialog Token field 605 in the Per-RU RSSI Report frame is set to the same value as in the Interference Measurement Dialog Token field in the soliciting Trigger frame. The AID Associated with Reported RU field 610 is set to the AID associated with the reported RU that is obtained from the AID12 subfield associated with the reported RU in the soliciting Trigger frame. The Measured RSSI On Reported RU field 615 is set to the measured RSSI for the respective RU (associated with the AID indicated in field 610). Fields 610 and 615 are repeated for each reported RU, where the Number of Reported RUs field 620 indicates how many RUs are reported in the Per-RU RSSI Report frame.

Methods of Coordinated Spatial Reuse Transmission

Embodiments of the present invention include devices that can transmit wirelessly according to constraints defined by a sharing AP and indicated in a C-SR Announcement frame. The C-SR Announcement frame can be carried in a control frame, for example. The constraints can be defined according to interference measurement reports generated by the shared and/or sharing APs (e.g., an SIR table). The sharing AP initiates C-SR transmission by sending a C-SR Announcement frame specifying for the shared AP(s) granted in the C-SR transmission the following constraints:

1. The C-SR duration (time units (TU)).
2. The C-SR bandwidth (e.g., P20, P40, P80, P160, P240, P320).
3. The C-SR maximum transmit power of shared AP (dBm).
4. The C-SR transmit power of sharing AP (dBm).

When the sharing AP schedules a downlink PPDU, the C-SR maximum transmit power of the shared AP is used for limiting the interference level caused by the shared AP on the scheduled STA by the sharing AP. When the shared AP schedules a downlink C-SR transmission, the C-SR transmit power of the sharing AP is used for calculating the interference level caused by the sharing AP on the scheduled STA by the shared AP.

Figure 7:
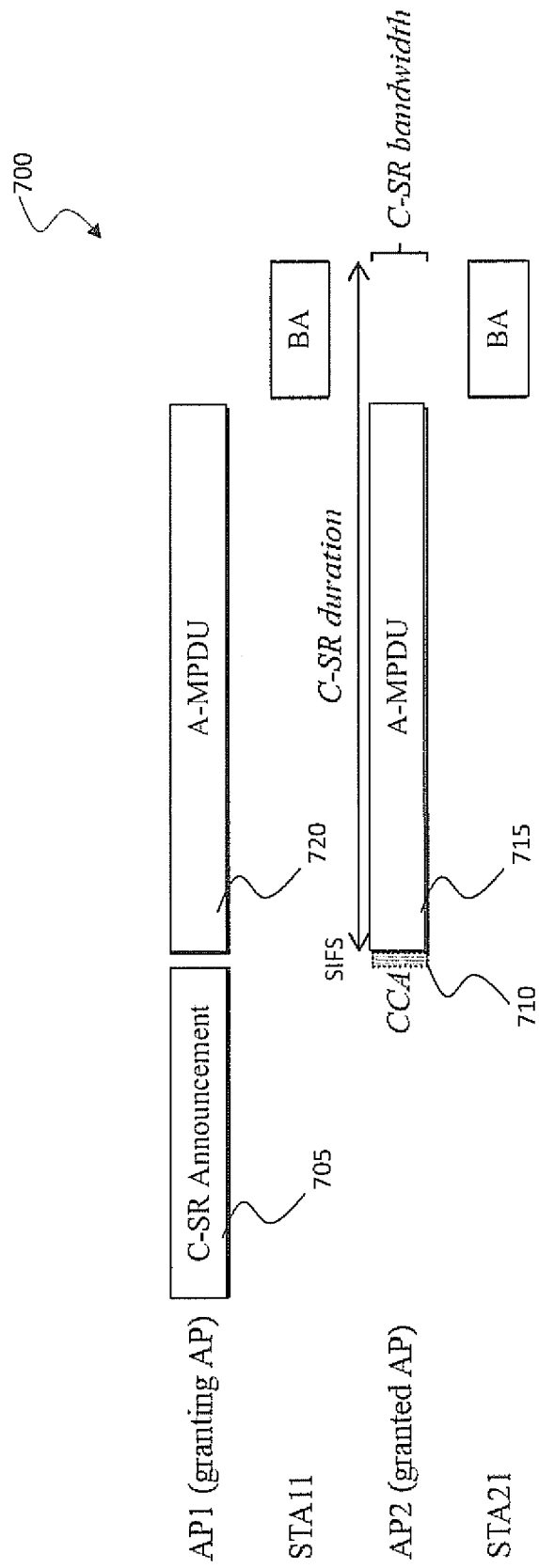
FIG. 7 is an exemplary wireless transmission timing diagram for transmitting data using C-SR where the shared AP performs CCA during the SIFS after the C-SR Announcement frame to transmit a trigger frame soliciting a TB PPDU according to embodiments of the present invention.

FIG. 7 is an exemplary wireless transmission timing diagram 700 for transmitting data using C-SR where the shared AP performs clear channel assessment (CCA) during the short inter-frame space (SIFS) after the C-SR Announcement frame 705 according to embodiments of the present invention. When both the physical and virtual CS are idle during CCA 710, the shared AP (AP2) can transmit downlink data (e.g., A-MPDU 715) during the C-SR duration using a transmit power that is less than or equal to the C-SR maximum transmit power of a shared AP indicated in C-SR Announcement frame 705. The shared AP disregards the NAV set by the sharing AP. The sharing AP (AP1) transmits downlink A-MPDU 720 simultaneously with the transmission of A-MPDU 715 according to a spatial reuse protocol without experiencing significant interference.

A C-SR Announcement frame can include a C-SR tolerable maximum interference signal strength (in units of decibel-milliwatts (dBm)) and a C-SR shared AP interference signal strength for C-SR transmission. The C-SR tolerable maximum interference signal strength in the C-SR Announcement frame indicates the maximum total interference signal strength for signals causing interference that effects the sharing AP. If the C-SR tolerable maximum interference signal strength is set to 0, the shared AP in the C-SR TXOP cannot solicit TB PPDUs other than the TB PPDU for the control response frame. The C-SR shared AP interference signal strength indicates the total interference signal strength (interference effecting the shared AP) as a result of transmissions from the sharing AP. This information is used by the scheduling procedure of the shared AP (e.g., the target STA, the RU, and the modulation and coding scheme (MCS)) for scheduling the transmission of future frames.

Figure 8:
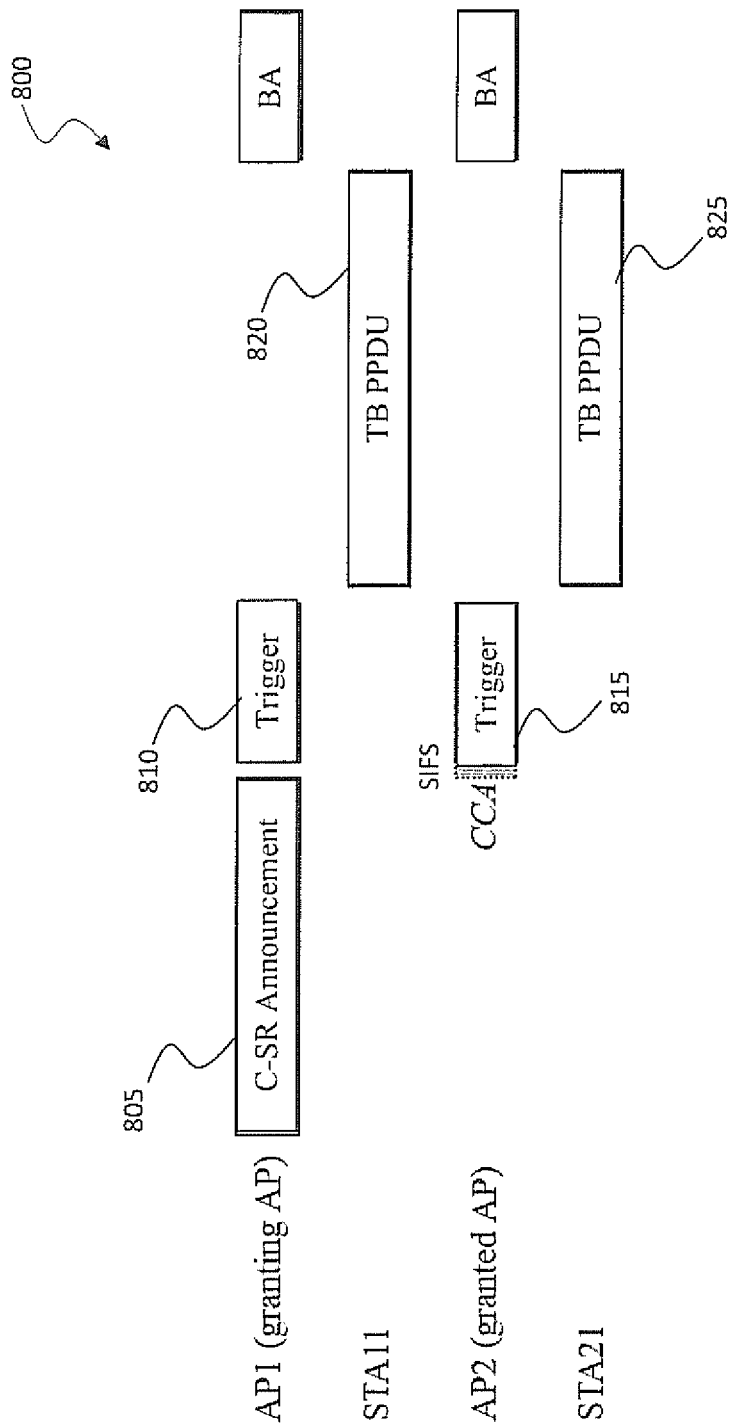
FIG. 8 depicts an exemplary C-SR Announcement frame including a C-SR tolerable maximum interference signal strength and a C-SR shared AP interference signal strength for the transmission of the TB PPDU using C-SR according to embodiments of the present invention.

In exemplary wireless transmission timing diagram 800 of FIG. 8, AP1 transmits C-SR Announcement frame 805 including a C-SR tolerable maximum interference signal strength. The shared AP performs the CCA during the SIFS after C-SR Announcement frame 805 TB PPDUs. Trigger frames 810 and 815 solicit uplink TB PPDUs from STA11 and STA21. TB PPDU 820 is transmitted by STA11 and TB PPDU 825 is transmitted by STA21 responsive to trigger frames 810 and 815, respectively. The total interference signal strength of the TB PPDUs effecting the sharing AP is less than the C-SR tolerable maximum interference signal strength indicated in the C-SR Announcement frame and substantial interference between the APs is advantageously prevented. STA11 and STA21 can transmit TB PPDUs 820 and 825 simultaneously on the same channel within overlapping BSSs without causing substantially interference that prevents the transmitted frames from being decoded successfully.

According to some embodiments, the UL Target RSSI field in the associated Trigger frame is set to a value meeting the C-SR tolerable maximum interference signal strength constraint. If the total interference level caused by the TB PPDUs effecting the sharing AP is greater than or equal to the C-SR tolerable maximum interference signal strength, the shared AP does not solicit the TB PPDUs.

The shared AP can declare the upper bound of the total interference signal strength effecting the shared AP caused by transmission from the sharing AP before receiving the C-SR Announcement frame. In this case, the C-SR shared AP interference signal strength in the C-SR Announcement frame should be less than or equal to the shared AP's declared upper bound. If the C-SR shared AP interference signal strength in the C-SR Announcement frame is not less than or equal to the shared AP's declared upper bound, the sharing AP does not include the corresponding shared AP in this C-SR transmission.

Exemplary Methods of Interference Measurement and Coordinated Spatial Reuse

Figure 9:
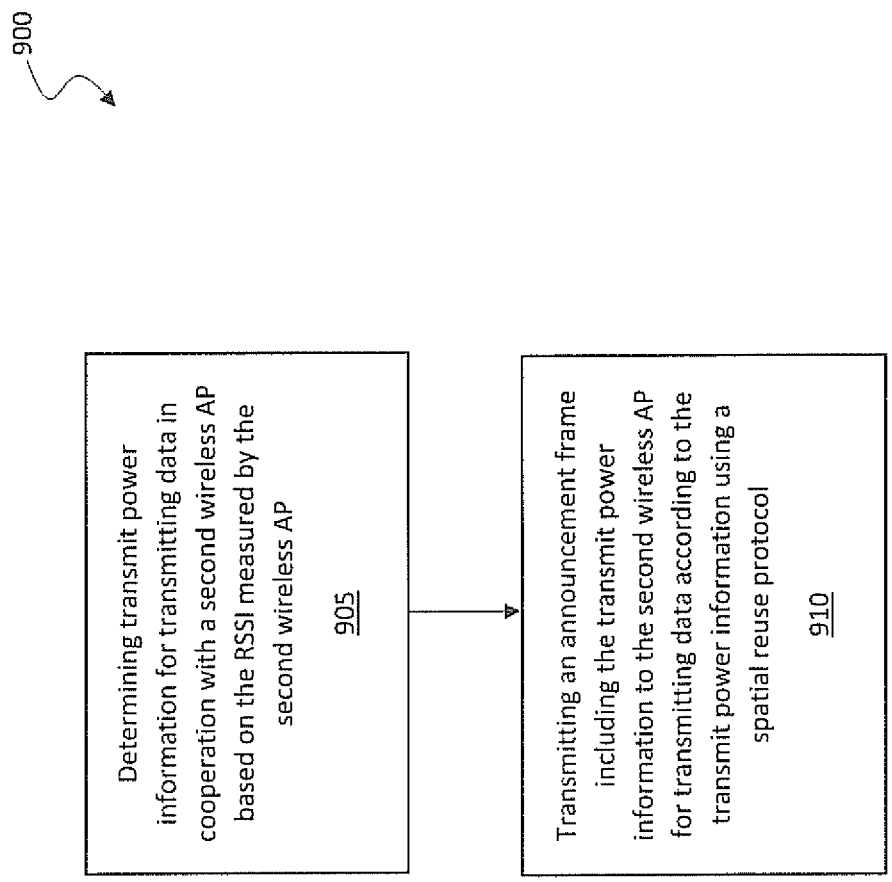
FIG. 9 is a flow chart of an exemplary computer implemented process for performing C-SR by a sharing AP according to embodiments of the present invention.

With regard to FIG. 9, an exemplary sequence of computer implemented steps of a process 900 for performing coordinated spatial reuse is depicted according to embodiments of the present invention. Automatic process 900 can be performed by a wireless AP (a "sharing AP") operating a BSS that overlaps with the BSS of another wireless AP (a "shared AP") on the same wireless channel.

At step 905, transmit power information is determined by a first wireless AP (sharing AP) for transmitting data in cooperation with a second wireless AP (shared AP). The transmit power information is determined based on RSSI measurements performed by the first wireless AP and/or the second wireless AP. For example, the RSSI measurements can be stored in memory in an SIR table and transmitted by the second wireless AP to the first wireless AP in a Per-RU RSSI report. Based on the RSSI measurements, C-SR can be performed by the wireless APs so that data can be transmitted simultaneously in the overlapping BSSs without causing substantial interference between the BSSs.

At step 910, the first wireless AP transmits a frame (e.g., a control frame or an announcement frame) including the transmit power information to the second wireless AP. The second wireless AP can transmit data according to the transmit power information using a spatial reuse protocol to substantially prevent interference between the overlapping BSSs. For example, the second wireless AP can transmit data using a transmit power that is less than a maximum transmit power indicated in the announcement frame, and can schedule transmissions from an associated wireless STA that are below a C-SR maximum transmit power of shared AP indicated in the announcement frame to prevent substantial inter-BSS interference. According to some embodiments, the frames are transmitted so that the total interference signal strength effecting to the first wireless AP is less than the indicated C-SR tolerable maximum interference signal strength.

Figure 10:
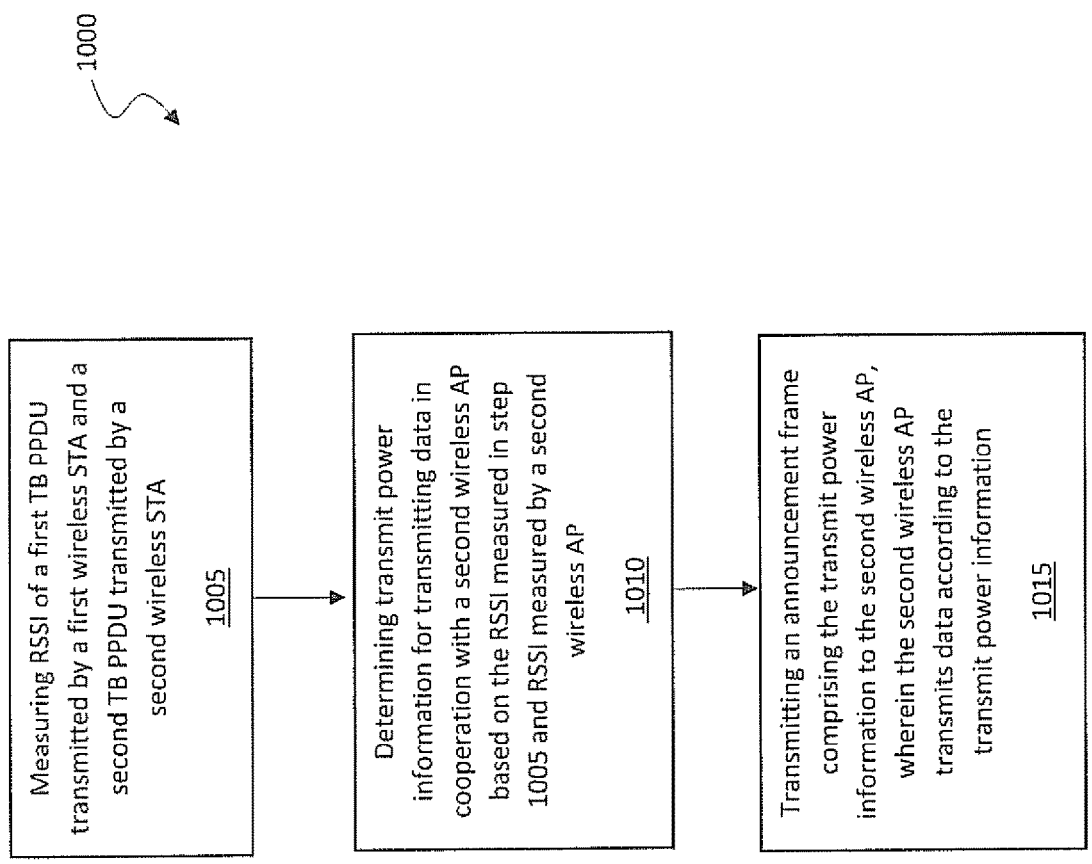
FIG. 10 is a flow chart of an exemplary computer implemented process for measuring interference and performing C-SR by a sharing AP according to embodiments of the present invention.

With regard to FIG. 10, an exemplary sequence of computer implemented steps of a process 1000 for performing coordinated spatial reuse is depicted according to embodiments of the present invention. Process 1000 can be performed by a wireless AP (a "sharing AP") operating a BSS that overlaps with the BSS of another wireless AP (a "shared AP") on the same wireless channel.

At step 1005, the RSSIs of TB PPDUs transmitted by a first wireless STA and a second wireless STA are measured by a first wireless AP and/or a second wireless AP. The first wireless STA and the second wireless STA are associated with the first wireless AP operating a BSS that overlaps with the BSS of the second wireless AP. The TB PPDUs are transmitted responsive to a trigger frame transmitted by the first wireless AP.

At step 1010, transmit power information for transmitting data using a spatial reuse protocol in cooperation with the BSS of the second wireless AP is determined by the first wireless AP based on the RSSI measured in step 1005.

At step 1015, the first wireless AP transmits a frame (e.g., a control frame or an announcement frame) comprising the transmit power information to the second wireless AP. The second wireless AP transmits data and schedules transmissions from associated wireless STAs according to the transmit power information to substantially prevent or mitigate interference between the overlapping BSSs according to a spatial reuse protocol. For example, the second wireless AP can be configured to transmit data using a transmit power that is equal to or less than a C-SR tolerable maximum interference strength. The second AP can also schedule transmissions from an associated wireless STA that are below a C-SR maximum transmit power of shared AP. The control frame or announcement frame includes the C-SR tolerable maximum interference strength and/or C-SR maximum interference signal strength to prevent substantial inter-BSS interference. According to some embodiments, the frames are transmitted so that the total interference signal strength effecting to the first wireless AP is less than the indicated C-SR tolerable maximum interference signal strength. By limiting transmit power to an upper threshold, the transmissions of neighboring BSSs can be prevented from interfering with inter-BSS transmissions.

Figure 11:
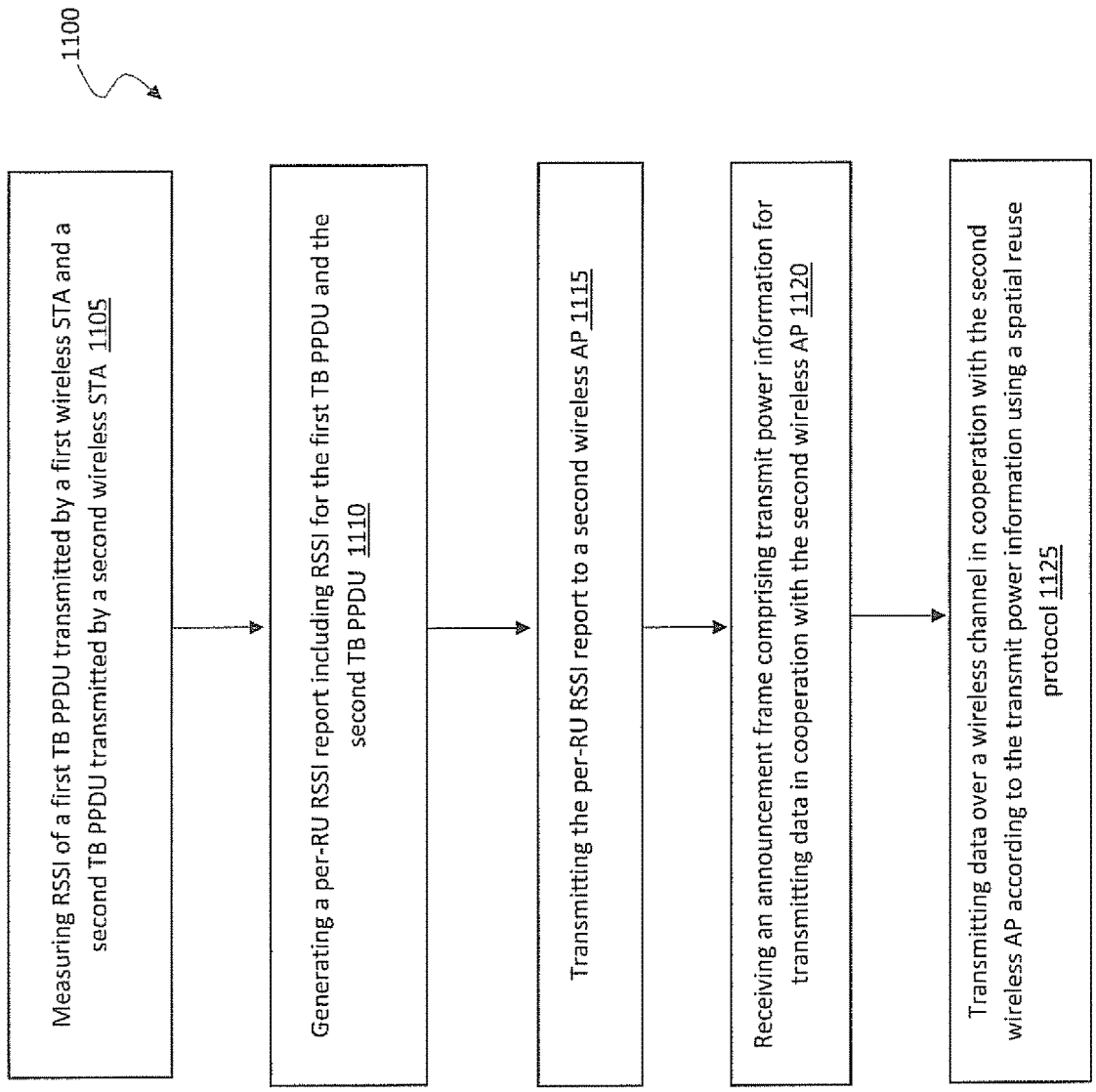
FIG. 11 is a flow chart of an exemplary computer implemented process for measuring interference and performing C-SR by a shared AP according to embodiments of the present invention.

With regard to FIG. 11, an exemplary sequence of computer implemented steps of a process 1100 for performing coordinated spatial reuse is depicted according to embodiments of the present invention. Process 1100 can be performed by a wireless AP (a "shared AP") operating a BSS that overlaps with the BSS of another wireless AP (a "sharing AP") on the same wireless channel.

At step 1105, RSSIs of a first TB PPDU transmitted by a first wireless STA and a second TB PPDU transmitted by a second wireless STA are measured.

At step 1110, a per-RU RSSI report including the RSSI for the first TB PPDU and the second TB PPDU as measured for the allocated RUs is generated.

At step 1115, the per-RU RSSI report is transmitted to a wireless AP (a sharing AP).

At step 1120, a frame (e.g., an announcement frame) including transmit power information for transmitting data in cooperation with the second wireless AP is received from the second wireless AP.

At step 1125, data is transmitted over a wireless channel in cooperation with the second wireless AP according to the transmit power information to substantially prevent or mitigate interference between the overlapping BSSs according to a spatial reuse protocol. The data can be downlink data transmitted by a wireless AP or uplink data transmitted by a wireless STA of an overlapping BSS. For example, step 1125 can include transmitting data using a transmit power that is less than a maximum transmit power indicated in the announcement frame, and/or scheduling transmissions from an associated wireless STA that are below C-SR maximum transmit power of the shared AP indicated in the announcement frame to prevent substantial inter-BSS interference. According to some embodiments, the data is transmitted so that the total interference signal strength effecting to the first wireless AP is less than the indicated C-SR tolerable maximum interference signal strength. By limiting transmit power to an upper threshold, the transmissions of neighboring BSSs can be prevented from interfering with inter-BSS transmissions.

Exemplary Computer Controlled System

Figure 12:
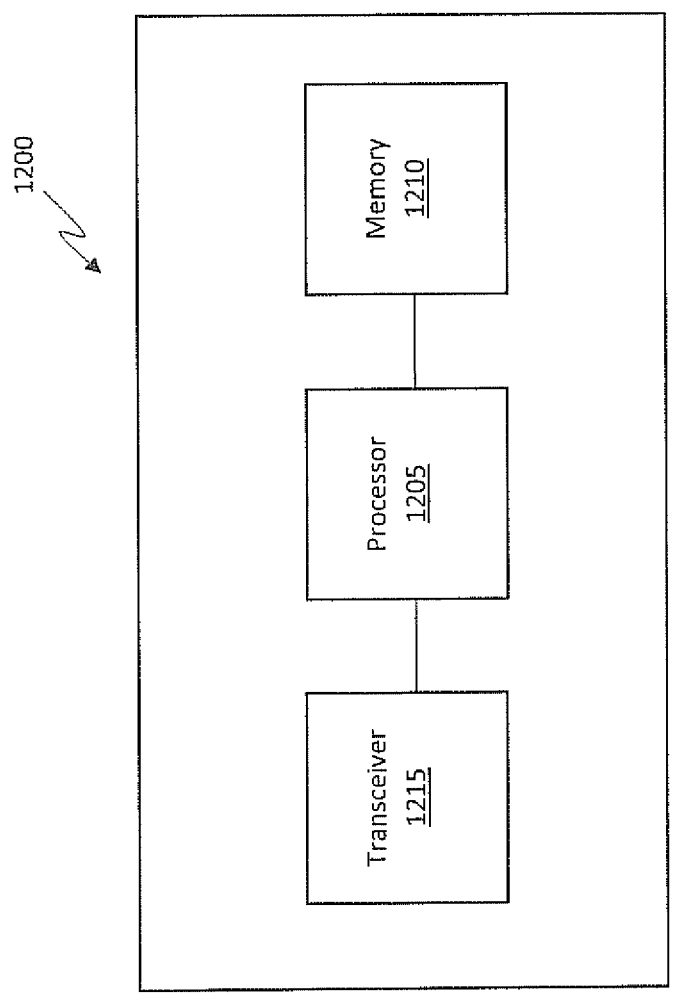
FIG. 12 is a block diagram depicting an exemplary computer system platform upon which embodiments of the present invention may be implemented.

FIG. 12 depicts an exemplary wireless device 1200 upon which embodiments of the present invention can be implemented. The wireless device 1200 can be a sharing AP or shared AP configured to perform coordinate spatial reuse, for example.

Embodiments of the present invention are drawn to electronic systems capable of performing coordinate spatial reuse for wirelessly transmitting data on a channel in coordination with another wireless AP operating an overlapping BSS using the same wireless channel. The device can perform RSSI measurements and generate Per-RU RSSI reports including the RSSI measurements information for transmission to another wireless AP. The RSSI measurement can be performed by the device based on power levels detected when receiving TB PPDUs transmitted by wireless STAs responsive to trigger frames, for example. Based on the Per-RU RSSI report, a wireless AP can be configured to transmit data to an associated wireless STA without causing significant interference when another AP of the overlapping BSS is also transmitting, and can schedule frames for transmission from associated wireless STAs accordingly.

The wireless device 1200 includes a processor 1205 for executing computer-readable instructions (e.g., running software applications and/or an operating system). Memory 1210 can include read-only memory and/or random access memory, for example, to store applications and data for use by the processor 1205 and data received or transmitted by a transceiver 1215. The wireless device 1200 can include more transceivers according to some embodiments. Transceiver 1215 communicate with other electronic devices over a wireless network (e.g., WLAN) and typically operates according to IEEE standards (e.g., IEEE 802.11ax, IEEE 802.11ay, IEEE 802.11be, etc.).

Embodiments of the present invention are thus described. While the present invention has been described in particular embodiments, it should be appreciated that the present invention should not be construed as limited by such embodiments, but rather construed according to the following claims.

What is claimed is:

1. A method of configuring a wireless access point for cooperative transmission in a wireless network, the method comprising:
a first wireless AP determining transmit power information for transmitting data in cooperation with a second wireless AP based on RSSI measured by the first wireless AP and the second wireless AP; and
the first wireless AP transmitting a coordinated spatial reuse announcement frame comprising the transmit power information to the second wireless AP, wherein the announcement frame comprises a maximum transmit power, wherein the second wireless AP is operable to transmit data on a wireless channel according to the transmit power information, and wherein the second wireless AP transmits data using a transmit power that is equal to or less than the maximum transmit power indicated in the announcement frame.

2. The method as described in claim 1, further comprising the first wireless AP transmitting a trigger frame during a transmission opportunity (TXOP) allocating resource units (RUs) to the first wireless AP for wireless transmissions, wherein the trigger frame causes a first wireless STA to transmit a first TB PPDU responsive to the trigger frame, causes a second wireless STA to transmit a second TB PPDU responsive to the trigger frame, wherein the first and second TB PPDUs are received by both the first wireless AP and a second wireless AP, and, responsive to the trigger frame, the second wireless AP is operable to:
measure RSSI of the first TB PPDU and the second TB PPDU;
generate a per-RU RSSI report comprising measured RSSI for the first TB PPDU and the second TB PPDU for the allocated RUs; and
transmit the per-RU RSSI report to the first wireless AP.

3. The method as described in claim 2, further comprising the first wireless AP transmitting a second per-RU RSSI report comprising RSSI measured by the first wireless AP.

4. The method as described in claim 3, wherein the first wireless AP and the second wireless AP are operable to measure and report interference simultaneously according to OFDMA.

5. The method as described in claim 1, wherein the announcement frame is a control frame.

6. The method as described in claim 1, wherein the announcement frame comprises a maximum interference signal strength, wherein the second wireless AP is operable to schedule transmissions from an associated wireless STA according to the maximum interference signal strength.

7. The method as described in claim 1, wherein the per-RU RSSI report is generated according to measured signal-to-interference ratios (SIRs) determined for a plurality of wireless STAs.

8. The method as described in claim 1, wherein the first wireless AP and the second wireless AP are configured to transmit data on the same wireless channel using a spatial reuse protocol according to the transmit power information.

9. A wireless access point (AP) apparatus for transmitting data over a wireless network, the apparatus comprising:
a transceiver configured to send and receive data over the wireless network;
a memory for storing data; and
a processor operable to:

measure RSSI of a first TB PPDU transmitted by a first wireless STA and a second TB PPDU transmitted by a second wireless STA;

determine transmit power information for transmitting in cooperation with the second wireless AP based on the RSSI measured by the first wireless AP and RSSI measured by the second wireless AP; and cause the transceiver to transmit a coordinated spatial reuse announcement frame comprising the transmit power information for receipt by the second wireless AP, wherein the announcement frame comprises a maximum transmit power, wherein the second wireless AP is operable to transmit data over a wireless channel according to the transmit power information, and wherein the second wireless AP transmits data using a transmit power that is equal to or less than the maximum transmit power indicated in the announcement frame.

10. The wireless AP apparatus as described in claim 9, wherein the processor is further operable to:

cause the transceiver to transmit a trigger frame during a transmission opportunity (TXOP) allocating resource units (RUs) to the wireless AP for wireless transmissions, wherein the trigger frame causes a first wireless STA to transmit the first TB PPDU responsive to the trigger frame, causes a second wireless STA to transmit the second TB PPDU responsive to the trigger frame, wherein the first and second TB PPDUs are received by the wireless AP and a second wireless AP, and wherein the second wireless AP is operable to:

measure RSSI of the first TB PPDU and the second TB PPDU;

generate a per-RU RSSI report comprising measured RSSI for the first TB PPDU and the second TB PPDU as measured for the allocated RUs; and transmit the per-RU RSSI report to the first wireless AP.

11. The wireless AP apparatus as described in claim 9, wherein the announcement frame is a control frame.

12. The wireless AP apparatus as described in claim 10, wherein the first wireless AP is operable to transmit a second per-RU RSSI report comprising RSSI measured by the first wireless AP.

13. The wireless AP apparatus as described in claim 9, wherein the announcement frame comprises a C-SR upper threshold transmit power, and wherein the first wireless AP and the second wireless AP are operable to transmit data simultaneously using the wireless channel, wherein the second wireless AP uses a transmit power that is equal to or less than a C-SR upper threshold transmit power indicated in the announcement frame.

14. The wireless AP apparatus as described in claim 9, wherein the announcement frame comprises a C-SR tolerable upper threshold interference signal strength, wherein the second wireless AP is operable to schedule transmissions from an associated wireless STA on the wireless channel according to the C-SR tolerable threshold interference signal strength.

15. The wireless AP apparatus as described in claim 9, wherein the per-RU RSSI report is generated according to measured signal-to-interference ratios (SIRs) determined for a plurality of wireless STAs.

16. A method of coordinated spatial reuse, the method comprising:

measuring RSSI of a first TB PPDU transmitted by a first wireless STA and a second TB PPDU transmitted by a second wireless STA for an allocated RU;

generating a per-RU RSSI report comprising measured RSSI for the first TB PPDU and the second TB PPDU for the allocated RU;

transmitting the per-RU RSSI report to a second wireless AP;

receiving a coordinated spatial reuse announcement frame comprising transmit power information for transmitting data in cooperation with the second wireless AP based on the per-RU RSSI report, wherein the announcement frame comprises a maximum transmit power; and transmitting data over a wireless channel in cooperation with the second wireless AP using a spatial reuse protocol according to the transmit power information, wherein the second wireless AP transmits data using a transmit power that is equal to or less than the maximum transmit power indicated in the announcement frame.

17. The method as described in claim 16, wherein the transmit power information comprises a threshold transmit power for downlink communication, wherein the transmitting data comprises transmitting an A-MPDU in cooperation with the second wireless AP by transmitting the A-MPDU using a transmit power that is equal to or less than the threshold transmit power.

18. The method as described in claim 16, wherein the transmit power information comprises an upper threshold interference level for uplink communication, wherein the transmitting data comprises scheduling an A-MPDU for transmission based on the upper threshold interference level for transmission by the first wireless STA or the second wireless STA.

19. The method as described in claim 16, further comprising:

receiving a trigger frame during a transmission opportunity (TXOP) of the second wireless AP allocating resource units (RUs) for wireless transmissions, wherein the first TB PPDU and second TB PPDU are transmitted responsive to the trigger frame, wherein the first TB PPDU and second the TB PPDUs are received by the second wireless AP, and wherein the second wireless AP is operable to:

measure RSSI of the first TB PPDU and the second TB PPDU; and calculate the transmit power information based on the RSSI of the first TB PPDU and the second TB PPDU and based on the per-RU RSSI report.

\* \* \* \* \*